United States Patent
Wijn et al.

(10) Patent No.: US 11,338,522 B2
(45) Date of Patent: May 24, 2022

(54) METHOD FOR CALIBRATING AN APPARATUS FOR PRODUCING AN OBJECT BY MEANS OF ADDITIVE MANUFACTURING

(71) Applicant: ADDITIVE INDUSTRIES B.V., Eindhoven (NL)

(72) Inventors: Erwin Wijn, Eindhoven (NL); Rob Peter Albert Van Haendel, Eindhoven (NL); Mark Herman Else Vaes, Eindhoven (NL)

(73) Assignee: ADDITIVE INDUSTRIES B.V., Eindhoven (NL)

( * ) Notice: Subject to any disclaimer, the term of this patent is extended or adjusted under 35 U.S.C. 154(b) by 177 days.

(21) Appl. No.: 16/638,565

(22) PCT Filed: Sep. 19, 2018

(86) PCT No.: PCT/NL2018/050616
§ 371 (c)(1),
(2) Date: Feb. 12, 2020

(87) PCT Pub. No.: WO2019/059761
PCT Pub. Date: Mar. 28, 2019

(65) Prior Publication Data
US 2020/0215760 A1   Jul. 9, 2020

(30) Foreign Application Priority Data
Sep. 21, 2017 (NL) ..................... 2019603

(51) Int. Cl.
*B29C 67/00* (2017.01)
*B29C 64/393* (2017.01)
(Continued)

(52) U.S. Cl.
CPC .......... *B29C 64/393* (2017.08); *B29C 64/135* (2017.08); *B29C 64/268* (2017.08);
(Continued)

(58) Field of Classification Search
CPC ... B29C 64/135; B29C 64/268; B29C 64/393; B33Y 10/00; B33Y 30/00; B33Y 50/00; B33Y 50/02
See application file for complete search history.

(56) References Cited

FOREIGN PATENT DOCUMENTS

| DE | 10 2016 200 043 A1 | 7/2017 |
|---|---|---|
| EP | 2983898 B1 | 3/2017 |

OTHER PUBLICATIONS

International Search Report for International Application No. PCT/NL2018/050616 dated Jan. 31, 2019.

*Primary Examiner* — Ryan M Ochylski
(74) *Attorney, Agent, or Firm* — Suiter Swantz pc llo (57) ABSTRACT

The invention relates to a method for calibrating an apparatus for producing an object by means of additive manufacturing. The apparatus comprises a process chamber, as well as a support for positioning the object in relation to a surface level of a bath of material to be solidified. A solidifying device is arranged for emitting a beam of radiation on the surface level for solidifying a selective part of said material. The solidifying device comprises a focus member for adjusting a focus setting. The method according to the invention comprises the steps of controlling the solidifying device for making test patterns at different focus settings. A calibration system with a sensor unit is used for determining characteristics of test patterns, and a calibrated focus setting is determined based on the characteristics.

15 Claims, 5 Drawing Sheets

(51) Int. Cl.
*B33Y 10/00* (2015.01)
*B33Y 30/00* (2015.01)
*B33Y 50/02* (2015.01)
*B29C 64/135* (2017.01)
*B29C 64/268* (2017.01)

(52) U.S. Cl.
CPC ............... *B33Y 10/00* (2014.12); *B33Y 30/00* (2014.12); *B33Y 50/02* (2014.12)

METHOD FOR CALIBRATING AN APPARATUS FOR PRODUCING AN OBJECT BY MEANS OF ADDITIVE MANUFACTURING

The invention relates to a method for calibrating an apparatus for producing an object by means of additive manufacturing.

3D printing or additive manufacturing refers to any of various processes for manufacturing a three-dimensional object. Traditional techniques like injection molding can be less expensive for manufacturing, for example, polymer products in high quantities, but 3D printing or additive manufacturing can be faster, more flexible and less expensive when producing relatively small quantities of three-dimensional objects.

It is anticipated that additive manufacturing becomes more and more important in the future, as the increasing competitive pressure forces companies to not only manufacture more economically with a constant high product quality but also to save time and costs in the area of product development. The life span of products is continuously shortened. In addition to product quality and product costs, the moment of market introduction is becoming increasingly important for the success of a product.

The three-dimensional object may be produced by selectively solidifying, in a layer-like fashion, a powder, paper or sheet material to produce a three-dimensional, 3D, object. In particular, a computer controlled additive manufacturing apparatus may be used which sequentially sinters a plurality of layers to build the desired object in a layer-by-layer fashion. Primarily additive processes are used, in which successive layers of material are laid down under computer control. These objects can be of almost any shape or geometry, and are produced from a 3D model or other electronic data source.

In order to print a three-dimensional object, a printable model is to be created with a computer design package or via a 3D scanner, for example. Usually, the input is a 3D CAD file such as an STL file, a STEP file or a IGS file. Before printing the object from a CAD file, the file is to be processed by a piece of software, which converts the model into a series of thin subsequent layers. Further, apparatus settings and vectors are generated for controlling the creation of each of the subsequent layers.

A laser comprised in the computer controlled additive manufacturing apparatus follows these settings and vectors to solidify successive layers of material to built the 3D object from a series of cross sections. These layers, which correspond to the virtual cross sections from the CAD model, are during this process joined or fused at the same time to create the final 3D object.

One of the challenges in the manufacturing of three dimensional objects, in particular in additive manufacturing of metal objects, is how to accurately solidify selective parts of the layer.

It is therefore an object of the invention to improve the accuracy of the apparatus for producing an object by means of additive manufacturing. In particular, it is an object of the invention to improve the accuracy of the focusing of the laser.

To this end, the invention provides a method for calibrating an apparatus for producing an object by means of additive manufacturing on a build surface of a build plate. Said apparatus comprises:

a process chamber for receiving a bath of powdered material which can be solidified by exposure to electromagnetic radiation;
a support for positioning the object in relation to a surface level of the bath of material;
a solidifying device arranged for emitting a beam of electromagnetic radiation on the surface level for solidifying a selective part of said material. The solidifying device comprises a focus member that is arranged for adjusting a focus setting of said beam of electromagnetic radiation. This way, the correct focus may be set.

According to the invention, the method comprises the steps of providing a calibration system with a sensor unit. Said calibration system may be arranged for performing and/or controlling one or more steps of the method according to the invention. In particular, the calibration system is arranged for determining a characteristic of a test pattern to be made with the solidifying device, as will be explained below. The calibration system may already be part of the apparatus, or may be a stand-alone unit.

In the method according to the invention, the solidifying device is controlled for making a first test pattern at a first focus setting, and for making a second test pattern at a second focus setting. The calibration system is then used for determining a first characteristic of the first test pattern obtained at the first focus settings, as well as a corresponding second characteristic of the second test pattern obtained at the second focus setting.

The second focus setting differs from the first focus setting. This way, it is possible to compare different focus settings to each other, and determine a calibrated or optimum focus setting. The second test pattern may be made at the exact same location as the first test pattern. For example the first test pattern may be made on a first calibration plate, and said test pattern may be analyzed to determine said first characteristic. Afterwards, a new calibration plate may be provided, and the second test pattern may be made on the second calibration plate, on the exact same location as the first test pattern was made. Then, said second test pattern may be analyzed. Alternatively, the first and second test patterns may be made at a first general location. In this case, the first and second test patterns are not made directly onto each other, but are made substantially next to each other, for example on a single calibration plate.

In any event, once the first and second test patterns are made and analyzed, and thus the first and second characteristics of the test patterns are determined, the first characteristic and the second characteristic form the basis for determining the calibrated focus setting. For example, one of the first and the second focus settings may be chosen as the desired focus setting for the solidifying device. Alternatively, the calibrated or optimum focus setting may be obtained by manipulating the obtained characteristics. For example, it is conceivable that the obtained characteristics are compared to a predetermined desired value, and that interpolation is used for obtaining the calibrated focus setting. In an embodiment of the invention, a function is fitted to the obtained results, and an optimum is determined based on a maximal (or minimal) value of the fitted function. This will be explained in more detail later with respect to a specific embodiment of the invention.

In any event, with the method according to the invention it is possible to determine a calibrated focus setting based on registering characteristics of test patterns. The result is an improved accuracy, and in particular an improved focus setting of the apparatus. Hence, the object of the invention is achieved.

Said focus member may comprise a galvo mirror element. In an apparatus that uses a galvo mirror element (without an additional F-Theta scan lens), the geometry of the system is already such that a single focus setting is not sufficient to produce accurate focus results. Generally, the system will be optimized for a focus that is in line with the optical axis of the system. Changing the laser's xy-position on the surface of the bath of material with respect to the optical axis, results in the laser beam's path being slightly longer. This effect is strongest on the edges of the bath of material to be solidified, due to the nature of the galvo mirror element. All in all, a generally sphere-like correction matrix is used to present an estimated accurate focus on all xy-positions. The method according to the invention may then be used to further improve the focus of the solidifying device on a number of discrete positions. The method may further comprise the step of interpolating the results obtained at these one or more discrete positions, for obtaining improved focus settings for xy-points that were not directly measured.

Advantageous embodiments of the method according to the invention will be described below.

In an embodiment, the method is repeated at least once. The method may be repeated, for example, at specific time intervals, to counter any time related changes in the focus settings. The method may additionally, or alternatively, be repeated for different location settings of the solidifying device. This way, the method may be performed at a first general location setting of the solidifying device, relating to a first general position on the surface level of the bath of material; as well as at a second general location setting of the solidifying device, relating to a second general position on the surface level of the bath of material. Repeating the method thus may comprise performing the method according to the invention as defined above at a second general location setting of the solidifying device, relating to a second general position on the surface level of the bath of material. The first and second general positions substantially differ from each other.

Repeating the method may also be advantageous when the apparatus comprises a plurality of solidifying devices, each having a respective focus member for adjusting a respective focus setting of a corresponding beam of electromagnetic radiation. By using the method, reliable calibration of the plurality of solidifying devices may be obtained. In particular, the plurality of solidifying devices may be arranged to operate at the same power setting, or at mutually different power settings.

Repeating the method may also be advantageous when the apparatus is operable at different power settings. The method may be performed at a first power setting, and subsequently the method may be repeated at a second power setting that is different from the first power setting. This allows the device to be focus calibrated at different power settings.

In an embodiment, a predetermined grid of different location settings is used for obtaining calibrated focus settings at the grid points of the predetermined grid. In an advantageous embodiment, a predetermined grid of different location settings is used for calibrating the apparatus at the grid points of the grid. The grid may be a rectangular grid, or square grid, although different geometries are conceivable as well. This way the focus setting may be calibrated over substantially the full build plate, i.e. over the full surface area of the surface of the bath of material.

The method may in particular comprise the additional step of making a fit based on the calibrated focus settings obtained for the grid points. This way, any local errors may be corrected or averaged out, and a calibrated focus setting may be obtained for the entire grid, i.e. not only for the grid points.

In an advantageous embodiment, a third test pattern at a third focus setting is used. Further test patterns at further focus settings may also be used. In this embodiment, the method comprises the steps of:
  controlling the solidifying device for making at least a third test pattern at at least a third focus setting;
  using the calibration system for determining at least a third characteristic of the at least third test pattern obtained at the at least third focus settings; and
  determining a calibrated focus setting based on the first characteristic, the second characteristic and the at least third characteristic.

By using more test patterns, at different focus settings, a more accurate calibrated focus setting may be determined. In particular, it is envisaged that at least five focus settings are used, preferably at least seven, and even more preferably at least nine, such as for example eleven. The tested focus settings may comprise an expected or nominal value ('0'-value), which may be based on a calculation in dependence of the geometrical set up of the solidifying device and the build surface. The tested focus settings may comprise positive and negative perturbations. The range of tested focus settings may comprise regular intervals. For example, the focus settings may be in a range of −10, −5, 0, 5 and 10 (arbitrary units).

In an embodiment, the corresponding first and second characteristic are determined based on an image obtained by the sensor unit. The sensor unit is used to make an image of the first test pattern. The sensor unit is also used to make an image of the second test pattern. The image made by the sensor unit may comprise both the first test pattern and the second test pattern. The image may contain the third and further test patterns, where applicable. Preferably, a single image is made for each test position. This means that a first image is made for the first general position, and a second image is made for the second general position. When the image contains a plurality of test patterns relating to a single test position, it is possible to directly compare the two test patterns with each other. When two (or more) images are compared to each other, it is required to use a standard imaging protocol, or to normalize the plurality of images. This may lead to subtle changes in an image, which is not desired. The use of a single image overcomes this drawback, and leads to a more accurate comparison.

The sensor unit may be arranged and designed in such a way that the image obtained by the sensor unit is on axis with respect to the solidifying device. This means that the xy-position of the image acquired by the sensor unit is the same, or generally the same, as the xy-position set for the solidifying devices when making the test patterns. This allows some feedback between the xy-position set and the determined focus settings.

In an embodiment, the characteristic comprises at least one of a contrast value, a color value, or a gray value. One (or more) of these values may be compared to each other to determine a calibrated focus setting. In particular, the average gray value for each test pattern may be used for determining the calibrated focus setting.

As an illustration, consider the situation in which a laser makes marks on a metal plate. When focus is off, the laser may not be able to generate a visible mark in the metal plate.

When focus improves, marks may become slightly visible. When focus is spot on, the mark will in general be clearly visible. This may lead to a relatively high contrast between the mark and the surrounding of the metal plate. Additionally, the average gray value of the different test patterns may increase or decrease when focus accuracy increases. This attribute may thus be used to determine whether focus is correct or not.

In an embodiment, the first test pattern comprises at least two substantially parallel lines at predetermined spaced intervals. This allows several parameters of the test pattern shown in the image to be analyzed.

In an embodiment, the step of determining a calibrated or optimum focus setting comprises the step of fitting a function relating the characteristic values obtained to the focus settings used. By fitting a function through the data points obtained, in dependence of the focus settings used, it will be possible to analyze, determine and/or calculate the optimal calibrated focus setting.

In an embodiment, the method comprises the step of determining a maximum or minimum value of the function. This allows the calibrated focus setting to be a focus setting that was not even used as a test setting at all. For example, consider the range of focus settings [−10, −5, 0, 5, 10]. The resulting characteristics for these focus settings are analyzed, and subsequently a parabola function (or similar or other function) is fitted to the data set. Based on the fit, the maximum of the parabola is calculated to be at a focus setting of −7—a point that was not tested at all. Hence, the determination of the maximum or minimum value of the function allows a more precise determination of the focus setting, without testing a large number of settings.

As described before, the function may be a parabola function, although other functions, in particular polynomial functions are conceivable as well.

In an advantageous embodiment, the method comprises the step of providing a calibration plate on the support, and making at least the first and second test patterns in the calibration plate. The first and second test patterns are made in a single calibration plate. When focus is to be calibrated for more positions, this single calibration plate may still be used. When more solidifying devices are present in the apparatus, a single calibration plate may still be used. Further test patterns may be made in the same calibration plate as well.

The calibration plate comprises, in an embodiment, a main body and a coating layer, wherein said main body and said coating layer have different material properties compared to each other, in particular wherein said main body has a different color compared to said coating layer. The thickness of the coating layer is preferably such that the electromagnetic radiation may remove the coating layer when a correct (or near correct) focus is applied. This way, a correct (or near correct) focus results in a maximized contrast between the parts of the calibration plate that have not been irradiated, and the parts that have been irradiated. This allows image analysis based on contrast value, or based on average gray value, for example to be used.

According to an aspect, the invention provides an apparatus for producing an object by means of additive manufacturing on a build surface of a build plate, the apparatus comprising:
  a process chamber for receiving a bath of powdered material which can be solidified by exposure to electromagnetic radiation;
  a support for positioning the object in relation to a surface level of the bath of material;
  a solidifying device arranged for emitting a beam of electromagnetic radiation on the surface level for solidifying a selective part of said material, wherein the solidifying device comprises a focus member for adjusting a focus setting of said beam of electromagnetic radiation; and
  a calibration system with a sensor unit, and arranged for:
    controlling the solidifying device for making a first test pattern at a first focus setting;
    controlling the solidifying device for making a second test pattern at a second focus setting;
    determining a first characteristic of the first test pattern obtained at the first focus settings, as well as a corresponding second characteristic of the second test pattern obtained at the second focus setting; and
    determining a calibrated focus setting based on the first characteristic and the second characteristic.

With the apparatus according to the invention, focus calibration is possible in a relatively easy, quick and reliable manner. Focus calibration may be repeated, for example directly after initial focus calibration to obtain improved results, and/or for example at regular time intervals, such that accurate focus is ensured over a longer period of time. Additionally, by incorporating the calibration system into the apparatus, a relatively autonomous and objective calibration is possible. This makes the calibration more reliable, in particular in between different positions, but also in between different time periods. Further advantages have already become apparent with respect to the description of the method according to the invention.

In an embodiment, the sensor unit is arranged for obtaining an image, and the calibration system is arranged for determining the corresponding first and second characteristic based on the image obtained by the sensor unit. In particular, the calibration system may be arranged for determining at least one of a contrast value, a color value, or a gray value as the first and second characteristic.

In an embodiment, the calibration system is arranged for controlling the solidifying device in making at least two substantially parallel lines at predetermined spaced intervals as the first test pattern. A similar pattern may be made as the second test pattern. Further patterns preferably use the same pattern as well.

In an embodiment, the calibration system is arranged for determining a calibrated or optimum focus setting by fitting a function relating the focus settings used to the characteristic values obtained. The calibration system may additionally be arranged for determining a maximum or minimum value of the function.

The invention will next be explained by means of the accompanying figures. In the figures.

Figure 1:
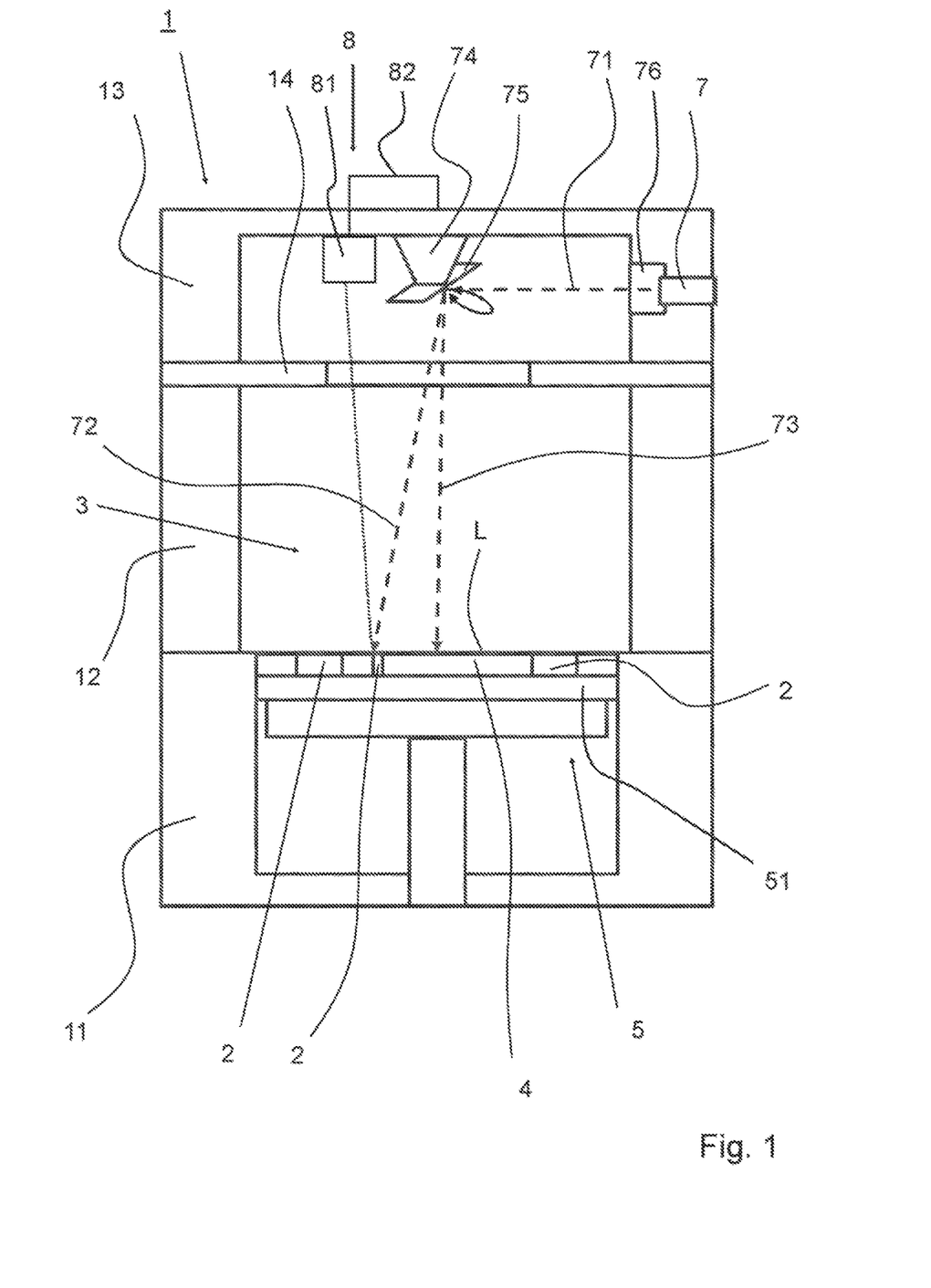
FIG. 1—shows a schematic overview of an apparatus according to the invention, arranged for producing an object by means of additive manufacturing.

FIG. 1 shows an overview of an apparatus 1 for producing an object 2 by means of additive manufacturing. The apparatus 1 is build from several frame parts 11, 12, 13. The apparatus comprises a process chamber 3 for receiving a bath of material 4 which can be solidified. In a lower frame part 11, a shaft is formed, wherein a support 5 is provided for positioning the object 2 (or even objects) in relation to the surface level L of the bath of material 4. The support 5 is movably provided in the shaft, such that after solidifying a layer, the support 5 may be lowered, and a further layer of material may be solidified on top of the part of the object 2 already formed. In a top part 13 of the apparatus 1, a solidifying device 7 is provided for solidifying a selective part of the material. In the embodiment shown, the solidifying device 7 is a laser device, which is arranged for producing electromagnetic radiation in the form of laser light 71, in order to melt a powdered material provided on the support, which then, after cooling forms a solidified part of the object to be produced. However, the invention is not limited to the type of solidifying device. As can be seen, the electromagnetic radiation 71 emitted by the laser device 7 is deflected by means of a deflector unit 74, which uses a rotatable optical element 75 to direct the emitted radiation 71 towards the surface L of the layer of material 4. Depending on the position of the deflector unit 74, radiation may be emitted, as an example, according to rays 72, 73. The solidifying device 7 comprises a focus element 76, which may be used to adjust the focus of the radiation, for example for adjusting for the increased distance covered by ray 72 compared to ray 73.

The apparatus 1 may further comprise a recoating device (not shown) which can be displaced along the surface L of the bath for levelling the surface L of the bath of material 4. Such a recoating device is known per se to those skilled in the art. With the method according to the invention, focus calibration is aimed at providing accurate focus on the surface L of the bath, since this is the surface level where the solidifying device needs to present accurate focus for solidifying material.

The apparatus 1 according to the invention comprises a calibration system 8 with a sensor unit 81. The sensor unit 81 is directed to the surface level L of the layer of material 4, or—in absence of material 4—towards the support 5. The calibration system 8 is connected to the apparatus 1 by means of line 82. With this, the calibration system may control the solidifying device, as will be explained below. The calibration system 8 may be a fixed part of the apparatus 1, or may be a more or less modular component that is connected to the apparatus 1 in case focus calibration of the apparatus is desired. Details of this calibration system and sensor unit 81 will become apparent later. It is noted here that the sensor unit 81 may comprise an imaging sensor for making an image of the surface level L of the layer of material, or any other material presented on the support (such as a calibration body), or of the support 5 itself. This imaging sensor may also be arranged in such a way that the optical path of the imaging sensor coincides with the optical path of the solidifying device, or is generally the same thereto. This is referred to as an on-axis imaging sensor.

Figure 2:
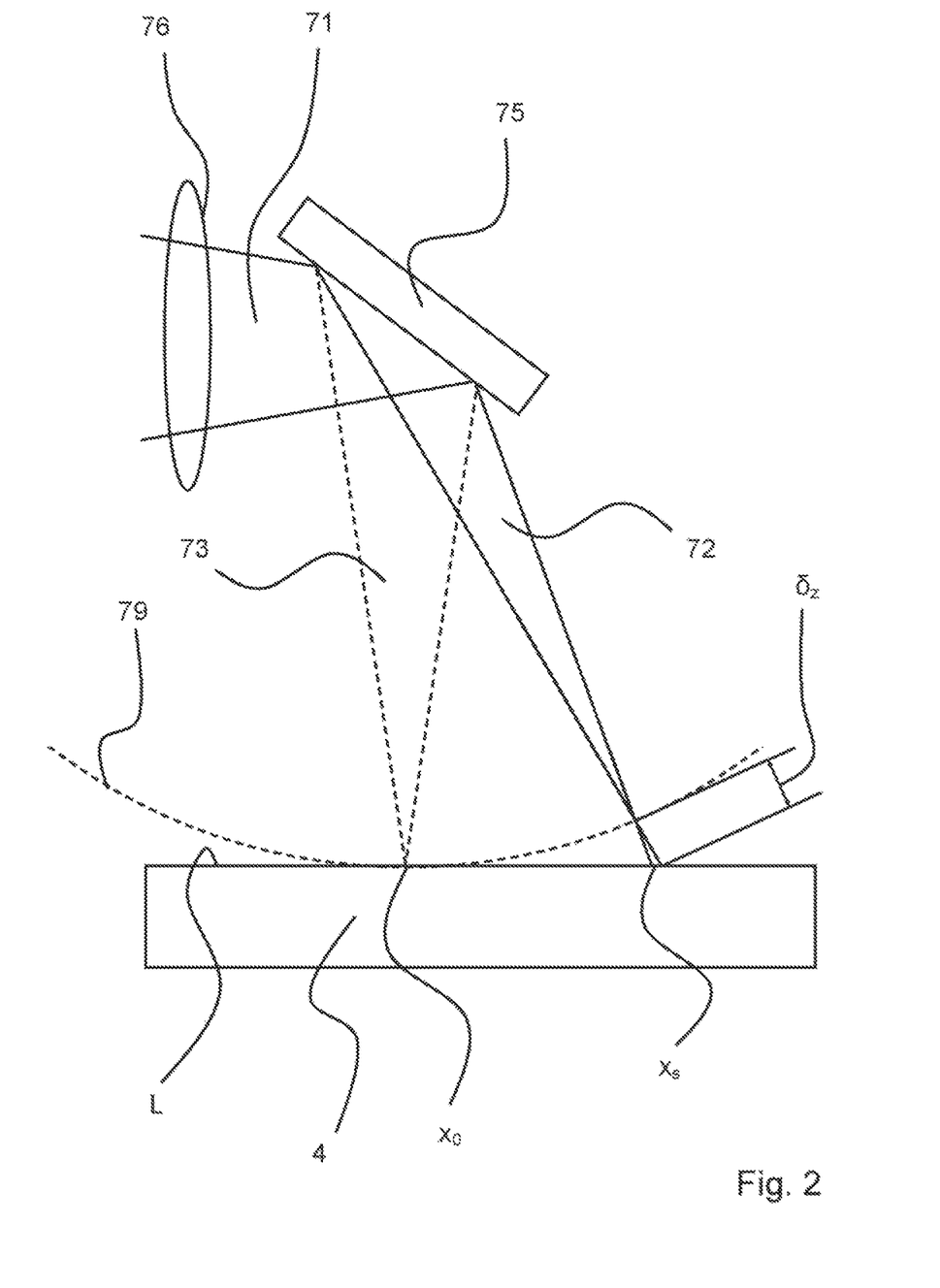
FIG. 2—shows a schematic overview of the electromagnetic radiation emitted by the solidifying device, via the rotatable deflector unit, onto the bath of material.

FIG. 2 shows a schematic detail of the laser beam 71, the rotatable optical element 76, and the radiation directed towards the surface L of the layer of material 4. Here, rays 73 and 72 show the radiation for different angular positions of the rotatable optical element 75. Due to the fact that a rotatable optical element 75 is used, a generally curved focal plane 79 is obtained. The build plate 51 (and the layer L of material 4) is a planar surface, and thus for a given position $x_s$ there will be an focus offset δz in the z-direction. Hence, the geometrical set up of the solidifying device 7, the deflector unit 74, and the build plate 51 on the support 5 leads to a general focus offset, that may be compensated for by a so called general focus setting, which adjusts the focus based on a given x-position. The general focus settings may be incorporated into a look-up table, and may be used by the device to change focus depending on the position on the layer of material. This general focus setting is referred to as the '0'-setting for any given position. It will be apparent to those skilled in the art, that the actual focus setting of these '0'-setting may differ for different locations on the build plate, as it is the result of the geometrical set up.

To further improve the focus, focus calibration according to the invention may be applied.

Figure 3:
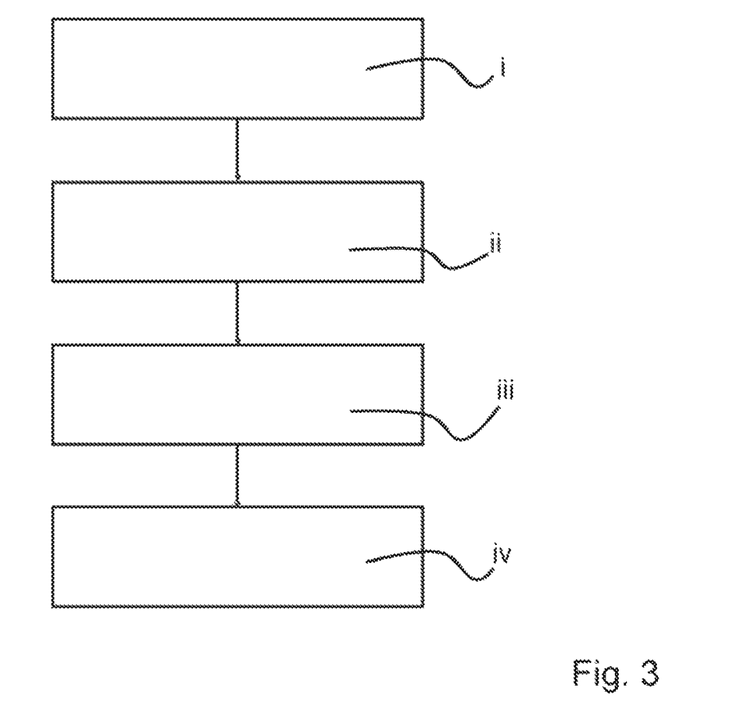
FIG. 3—shows schematically steps comprised in the method according to an embodiment of the invention.

As schematically indicated in FIG. 3, the method according to the invention comprises, for a first position, the general steps of:

i) making a plurality of test patterns at a corresponding plurality of focus settings;
ii) determining a plurality of characteristics corresponding to each of the plurality test patterns;
iii) determining a calibrated focus setting based on the plurality of characteristics.
iv) incorporating the calibrated focus setting for the first position.

The method may be repeated, if desired, for a plurality of positions such that not only a first position, but also a second position and for example at least a third position is calibrated with the method according to the invention. As described earlier, the method may be used for determining a calibrated focus setting for a number of grid points on a pre-determined grid.

Figure 4:
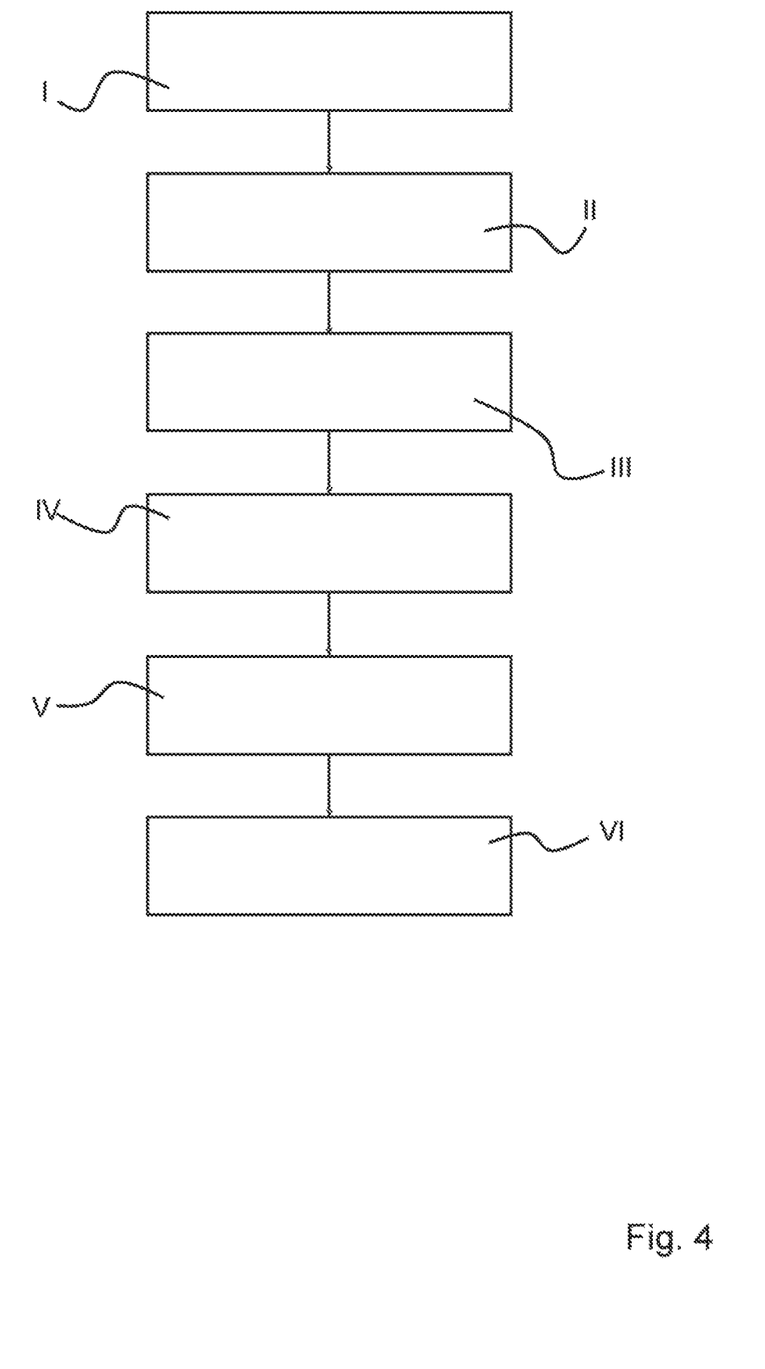
FIG. 4—shows schematically steps comprised in the method according to a further embodiment of the invention.

FIG. 4 schematically indicates a further embodiment of the method according to the invention. Here, the method comprises, for at least a first position, the steps of:

I) making a plurality of test patterns at a corresponding plurality of focus settings;
II) determining a plurality of characteristics corresponding to each of the plurality test patterns;
III) relating the characteristics to the plurality of focus settings;
IV) fitting a function to the focus settings as a domain, and the resulting characteristics as a co-domain;
V) determining a minimal or maximal value of the function fitted to the data;
VI) incorporating the calibrated focus setting for the first position Here also, the method may be repeated, if desired, for a plurality of positions such that not only a first position, but also a second position and for example at least a third position is calibrated with the method according to the invention. As described earlier, the method may be used for determining a calibrated focus setting for a number of grid points on a pre-determined grid, in particular a regular grid. In an embodiment, the method comprises the additional step of interpolating results obtained for the number of grid points to obtain interpolated focus settings.

In an embodiment, the method comprises the step of fitting a predetermined function to the calibrated focus settings obtained for the grid. This way, any errors and/or outliers obtained during calibration are averaged, resulting in generally smooth and accurate focus settings for the entire grid.

The method according to this embodiment will be described further with respect to FIGS. 5-7.

Figure 5:
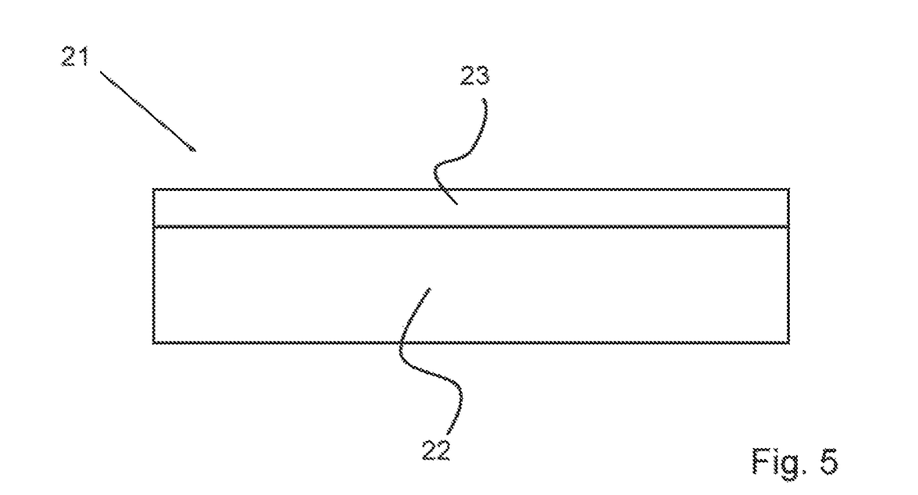
FIG. 5—shows schematically a calibration plate that can be used in the method according to the invention.

FIG. 5 schematically shows a calibration plate 21 that may be used in the method. The calibration plate 21 comprises a calibration body 22 and a coating layer 23. The calibration plate 21 may be a metal plate. The coating layer may be a relatively thin layer 23 of a material having a different color with respect to the calibration body 22. This way, eroding the coating layer 23 will reveal the calibration body 22 of different color. This may be used, advantageously, in determining whether the applied focus setting is optimal or not.

Figure 6:
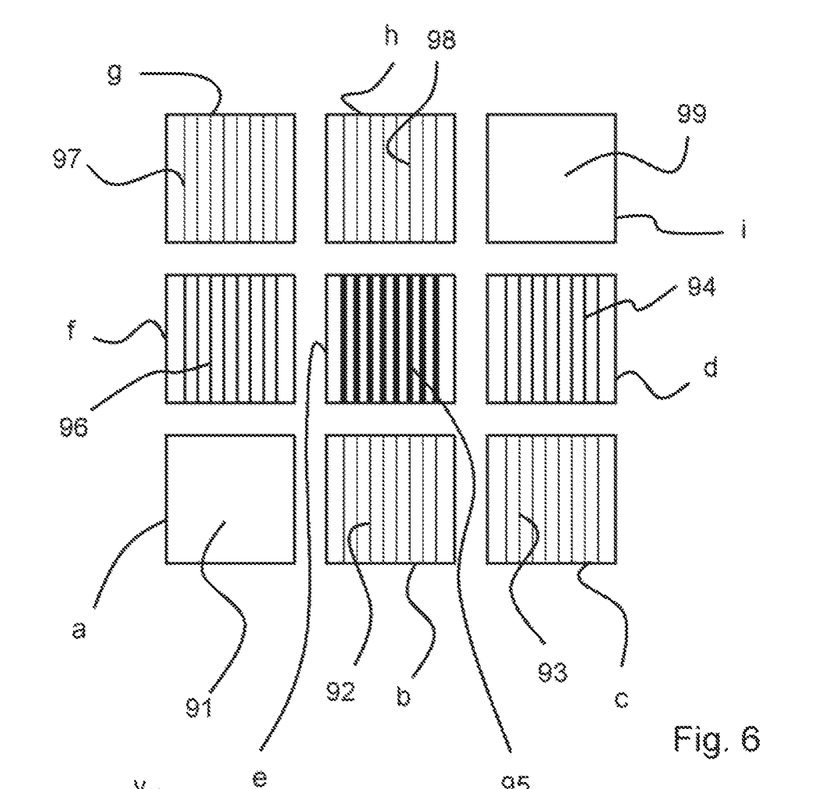
FIG. 6—shows schematically a calibration pattern that can be made in the method according to the present invention, using the calibration plate as described in FIG. 5.

FIG. 6 shows how a total of nine test patterns a-i may be provided, for example in the calibration plate 21 as shown in FIG. 5. Here, a number of different focus settings are used in the subsequent nine patterns a-i. For example, test pattern e may use the general (or '0') focus setting. Test pattern a may be performed at a negative setting, test pattern i at a positive setting. The focus setting may be [−20, −15, −10, −5, 0, 5, 10, 15, 20] for the respective test patterns [a, b, c, d, e, f, g, h, i].

It can be seen in FIG. 6 that for each test square a-i a test pattern consisting of a total number of eight lines is produced. The lines, and the number of lines are shown as an example. Those skilled in the art will appreciate that different patterns and/or different number of elements may be used. In these figures it can be seen that in test pattern a no lines 91 are visible. With increasing focus settings, lines 91-94 become more clear and more pronounced, and become optimal in test pattern e with lines 95, after which increasing the focus setting results in reduced visibility of the lines 96-99, until for test pattern i no lines 99 are visible anymore.

It is noted that when the calibration plate 21 of FIG. 5 is used, the results shown in FIG. 6 are inversed, meaning that white parts are in fact black, and black parts are in fact white. This is due to the fact that the black coating of the calibration plate 21 will remain black when focus is not accurate, and will be removed when focus is more accurate.

In a more or less automatic manner, the sensor unit 81 may be used to make an image of the nine test patterns a-i. Image analysis may be performed on the single image to obtain a characteristic value. In the example shown, the characteristic value is the average gray value of the test square a-i.

It is noted that the method according to the invention may be performed at a first power setting, and that the method may be repeated at a second power setting that is different from the first power setting. With respect to FIG. 6 this means that the nine patterns may be made at the first power setting, and that subsequently additional nine patterns may be made, for example in the vicinity of the first nine patterns, at a second power setting. This allows the device to be focus calibrated at different power settings.

Figure 7:
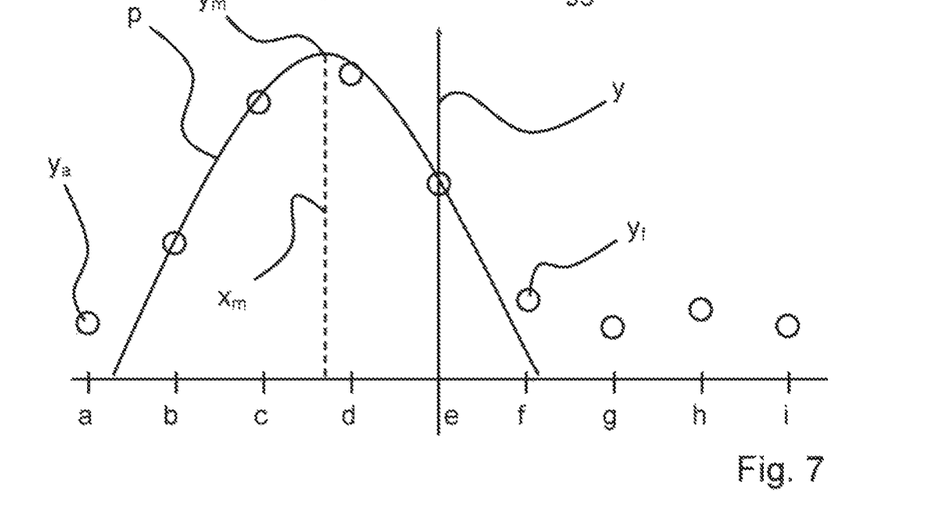
FIG. 7—shows an overview of determining an optimum setting for the apparatus according to the invention.

FIG. 7 shows that the characteristic value is plotted against the focus setting for the different test patters a-i. The characteristic value (here the average gray value) is relatively high for test samples c and d, and relatively low for test samples a, g, h, and i. Since it is expected that there is one single optimal focus setting, a parabola function may be fitted to the data points $y_a$-$y_i$. After the function is fit, the maximum value $y_m$ and the corresponding calibrated focus setting $x_m$ may be determined. This focus setting may then be used as the setting for this position. The steps shown in FIG. 7 may be performed completely within the calibration system, i.e. without actually plotting the data points and the fitted graph. An iteration step may be used to further improve the calibration. This means that the updated focus settings are entered into the apparatus, and that calibration according to the invention is repeated. This way an updated calibration focus setting is obtained.

With the method and apparatus according to the invention, an accurate focus calibration is possible. Several embodiments have been described with reference to the Figures. The desired protection is defined in the appended claims.

The invention claimed is:

1. A method for calibrating an apparatus for producing an object by means of additive manufacturing on a build surface of a build plate, the apparatus comprising:
   a process chamber for receiving a bath of powdered material which can be solidified by exposure to electromagnetic radiation;
   a support for positioning the object in relation to a surface level of the bath of material;
   a solidifying device arranged for emitting a beam of electromagnetic radiation on the surface level for solidifying a selective part of said material, wherein the solidifying device comprises a focus member for adjusting a focus setting of said beam of electromagnetic radiation;
   wherein the method comprises the steps of:
   providing a calibration system with a sensor unit;
   controlling the solidifying device for making a first test pattern at a first focus setting;
   controlling the solidifying device for making a second test pattern at a second focus setting;
   using the calibration system for determining a first characteristic of the first test pattern obtained at the first focus setting; and a corresponding second characteristic of the second test pattern obtained at the second focus setting; and
   determining a calibrated focus setting based on the first characteristic and the second characteristic;
   wherein the step of determining the calibrated focus setting comprises fitting a function relating the focus settings used to the characteristics obtained.

2. The method according to claim 1, wherein the method is repeated at least once.

3. The method according to claim 1, wherein the method is performed at a first general location setting of the solidifying device, relating to a first general position on the surface level of the bath of material.

4. The method according to claim 2, wherein repeating the method comprises performing the method at a second general location setting of the solidifying device, relating to a second general position on the surface level of the bath of material.

5. The method according to claim 1, further comprising the steps of:
   controlling the solidifying device for making at least a third test pattern at at least a third focus setting;
   using the calibration system for determining at least a third characteristic of the at least third test pattern obtained at the at least third focus settings; and
   determining a calibrated focus setting based on the first characteristic, the second characteristic and the at least third characteristic.

6. The method according to claim 1, wherein the corresponding first and second characteristic are determined based on an image obtained by the sensor unit, wherein the characteristic comprises at least one of a contrast value, a color value, and a gray value.

7. The method according to claim 1, wherein the first test pattern comprises at least two substantially parallel lines at predetermined spaced intervals.

8. The method according to claim 1, comprising the step of determining a maximum or minimum value of the function, wherein the function is a parabola-like function.

9. The method according to claim 1, wherein a predetermined grid comprising grid points at different location settings is used for obtaining calibrated focus settings at the grid points of the predetermined grid, wherein the method comprises the additional step of fitting a function based on the calibrated focus settings obtained for the grid points.

10. The method according to claim 1, wherein the method comprises the step of providing a calibration plate on the support, and making at least the first and second test patterns in the calibration plate.

11. The method according to claim 10, wherein the calibration plate comprises a main body and a coating layer, wherein said main body and said coating layer have different material properties compared to each other, and wherein said main body has a different color compared to said coating layer.

12. An apparatus for producing an object by means of additive manufacturing on a build surface of a build plate, the apparatus comprising:
   a process chamber for receiving a bath of powdered material which can be solidified by exposure to electromagnetic radiation;
   a support for positioning the object in relation to a surface level of the bath of material;
   a solidifying device arranged for emitting a beam of electromagnetic radiation on the surface level for solidifying a selective part of said material, wherein the solidifying device comprises a focus member for adjusting a focus setting of said beam of electromagnetic radiation;
   a calibration system with a sensor unit, and arranged for:
   controlling the solidifying device for making a first test pattern at a first focus setting;
   controlling the solidifying device for making a second test pattern at a second focus setting;
   determining a first characteristic of the first test pattern obtained at the first focus setting, and a corresponding second characteristic of the second test pattern obtained at the second focus setting; and
   determining a calibrated focus setting based on the first characteristic and the second characteristic;
   wherein the step of determining the calibrated focus setting comprises fitting a function relating the focus settings used to the characteristics obtained.

13. The apparatus according to claim 12, wherein the sensor unit is arranged for obtaining an image, and wherein the calibration system is arranged for determining the corresponding first and second characteristic based on the image obtained by the sensor unit, wherein the calibration system is arranged for determining at least one of a contrast value, a color value, and a gray value as the first and second characteristic.

14. The apparatus according to claim 12, wherein the calibration system is arranged for making at least two substantially parallel lines at predetermined spaced intervals as the first test pattern.

15. The apparatus according to claim 12, wherein the calibration system is arranged for determining a maximum or minimum value of the function.

* * * * *